Figure 1:
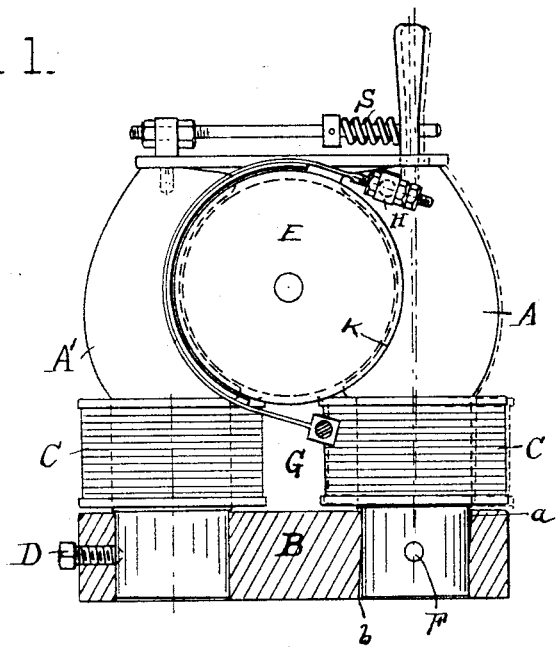

(No Model.) 3 Sheets—Sheet 1.

G. S. DUNN.
ELECTRIC MOTOR.

No. 515,755. Patented Mar. 6, 1894.

Witnesses:
Samuel W. Balch
Schuyler N. Wheeler

Inventor,
Gano S. Dunn,
by Thomas Ewing, Jr
Attorney.

(No Model.) 3 Sheets—Sheet 2.

G. S. DUNN.
ELECTRIC MOTOR.

No. 515,755. Patented Mar. 6, 1894.

Witnesses
Inventor
Geo. S. Dunn
By his Attorney
Thomas Ewing Jr.

(No Model.) 3 Sheets—Sheet 3.

G. S. DUNN.
ELECTRIC MOTOR.

No. 515,755. Patented Mar. 6, 1894.

Witnesses
Chas. P. Bishop
L. K. Munford

Inventor
Geo. S. Dunn
By his Attorney
Thomas Ewing Jr

UNITED STATES PATENT OFFICE.

GANO S. DUNN, OF NEW YORK, N. Y., ASSIGNOR TO THE CROCKER-WHEELER ELECTRIC COMPANY, OF NEW JERSEY.

ELECTRIC MOTOR.

SPECIFICATION forming part of Letters Patent No. 515,755, dated March 6, 1894.

Application filed July 29, 1893. Serial No. 481,865. (No model.)

*To all whom it may concern:*

Be it known that I, GANO S. DUNN, a citizen of the United States of America, residing in the city, county, and State of New York, have invented certain new and useful Improvements in Electric Motors, of which the following is a specification.

The object of my invention is to utilize the magnetism of the normal magnetic circuit through the armature and field of a dynamo or motor or other analogous machine to operate some attachment to the machine, and thereby effect some useful result such as heretofore has been accomplished by a separate magnet or by establishing in the machine some other magnetic circuit in addition to the normal circuit. I thus effect the operation of this attachment without increasing the number of lines of magnetic force beyond those required to pass through the field and armature in order to give the machine the desired power. In order to effect this I introduce at some point in the magnetic circuit a movable part which forms a portion of the normal magnetic circuit through the armature and field. This is an essential part of the circuit, since its removal would diminish the power of the machine. Under the influence of the magnetism of the circuit this movable part is actuated in a sense different from the rotation of the armature. Its actuation may be distinguished from the rotation of the armature by stating that when moved under the influence of the magnetism of the circuit through the armature and field the magnetic resistance of the circuit diminishes with its change of position. I combine with this movable part other elements to form a magnetic device in which the said movable part is the magnetically actuated part, or at least one of such parts if there be more than one magnetically actuated part in the device.

With this explanation my invention may be defined broadly as the combination of an electric dynamo or motor and a magnetic device, the two having a common part, which part is the part of said device magnetically actuated, and forms an essential portion of the normal magnetic circuit of the dynamo or motor.

In the accompanying drawings which form a part of this specification my invention is illustrated by a number of devices.

Figure 2:
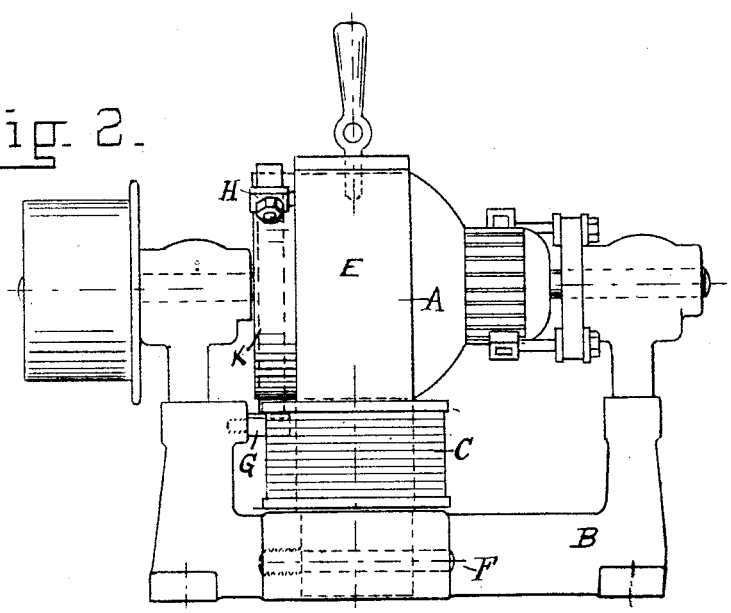
Figure 3:
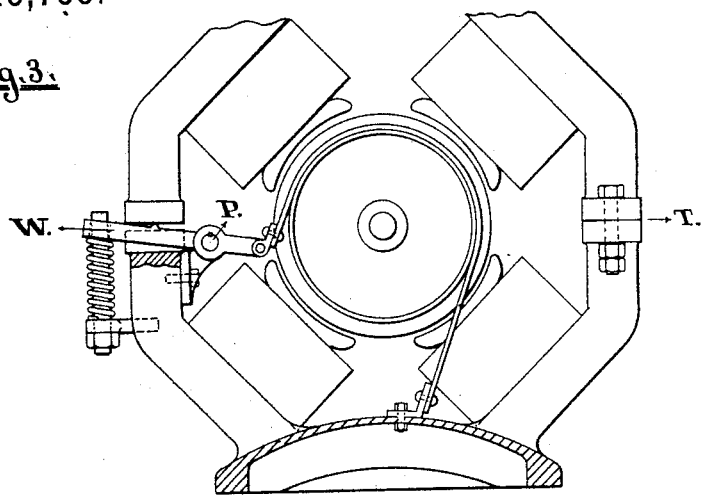
Figure 4:
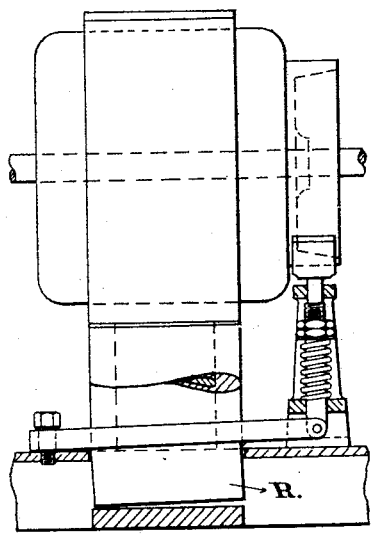
Figure 5:
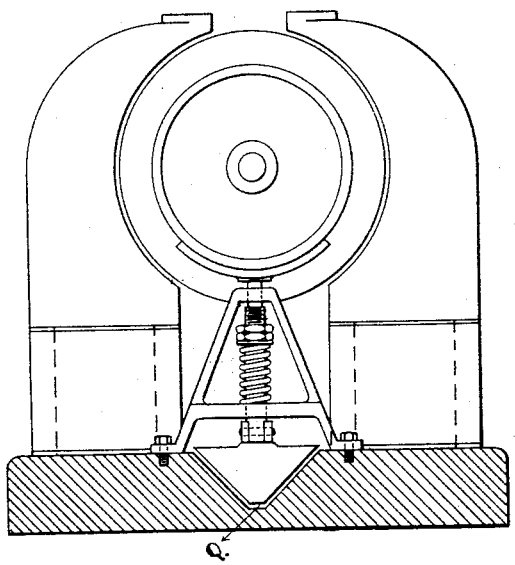
Figure 6:
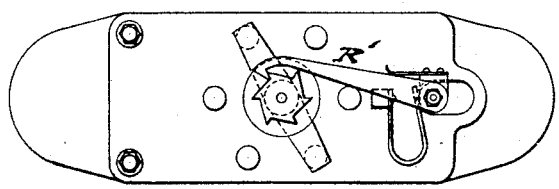
Figure 7:
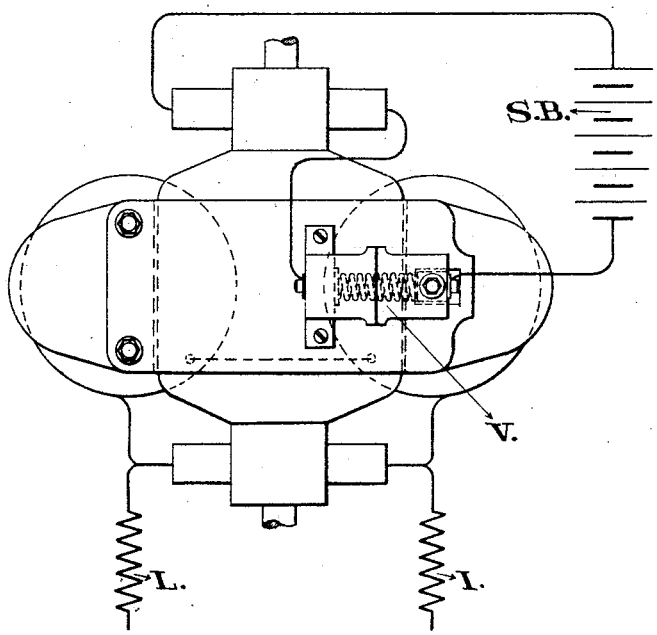

Figure 1 is an end view of a motor, partly in section and partly in elevation, with a pivoted pole piece and a brake for the armature operated by movement of the pole piece. Fig. 2 is a side view of the same in elevation. Fig. 3 is a side view in elevation of a multipolar machine, with an armature brake operated as in Figs. 1 and 2. Figs. 4 and 5 are respectively end and side views of a modification in which the armature brake is operated by another part in the magnetic circuit. Figs. 6 and 7 show switches operated in the same manner as the brakes are operated in the foregoing figures, to any one of which a switch might be added as indicated in Figs. 6 and 7.

When the current is suddenly turned off from an electric motor its armature continues to spin until its momentum is exhausted. To prevent this it has been heretofore customary to provide a brake controlled by a supplemental magnet, applied on cessation of the current and relieved when the current is turned on. This complicates the machine by the addition of a part and wastes a portion of the current.

Referring first to Figs. 1 and 2, the field magnets A A' are mounted in the base B of the machine. The field coils C are slipped onto the pole pieces before they are mounted in the base. The field magnet A' fits snugly in the perforation in the base provided for it, and is held in place by a set screw D. But the field magnet A is free to play toward and from the armature E through a distance of about one-eighth of an inch. To effect this it is mounted on a rod or axis F parallel to the axis of the armature, and the orifice in the base into which the field magnet fits widens slightly outwardly at the top (see *a*) and inwardly at the bottom (see *b*), to admit the play of the field magnet. The brake as shown is an ordinary strap brake and is attached at its lower end G to the frame of the machine and at the end H to the upper end of the field magnet A. The brake presses upon a flange K attached to the armature. When the current is on, the field magnet A is drawn toward the armature and held by the magnetic forces of the field and the brake is relieved. When the current is cut off the force of a spring S throws the field magnet A back and the brake is applied. The play of the field magnet A in the base is so slight as not materially to affect the magnetic efficiency of the motor.

Fig. 3 shows a multipolar machine in which one side of the field is on a frame hinged at T. The movement of this side toward the armature, when the current is turned on, operates to relieve the armature-brake through a lever W pivoted at P.

In Figs. 4 and 5 the magnetic circuit is partly (and may be wholly) severed at a point Q and a piece R is provided to fit into the cut. The movement of this piece when the current is turned on operates the brake and relieves it.

In Fig. 6 one of the pole pieces, mounted as the pole piece A in Figs. 1 and 2, operates a step-by-step mechanism R' which may control a switch, or a registering device, or the like.

Fig. 7 shows a motor-dynamo and system. One of the pole pieces is mounted as the pole piece A in Figs. 1 and 2. Upon the end of this pole piece, or upon a lever controlled thereby, is a switch V. L L are the leads of the feed circuit, and from them wires are carried to the field and armature motor-coils of the machine. The armature dynamo-coils are connected through the switch V with any desired circuit, as for instance one in which there is a secondary battery S B. When the machine is in operation this circuit is closed at the switch V. When the current fails or is cut off this switch is opened by a spring or other suitable device.

It is obvious that many modifications may be made in the above described construction without departing from the spirit of my invention. The essential feature is the combination with an electric motor or dynamo of a magnetic device, such for example as the magnetic brake or magnetic switch herein illustrated, the part of said device magnetically actuated, for example, the field magnet A in Figs. 1 and 2, the side of the field on the frame hinged at F, in Fig. 3, or the piece R, in Figs. 4 and 5, forming a portion of the normal magnetic circuit of the motor or dynamo, that is, of the circuit which includes the armature and field. The attraction developed in the magnetic circuit is so enormous that it may be utilized to do work requiring enormous force. Thus in a five horse power motor of the Crocker-Wheeler type in which the pole pieces are magnetized to about five thousand lines of force per square inch and have an area of about forty square inches, the pull on one of the pole pieces is about five hundred pounds, and if any other portion of the circuit, such as the yoke, is movable the pull will be about a ton.

What I claim, and desire to secure by Letters Patent, is—

1. A dynamo or motor in the normal magnetic circuit of which is included as an essential portion thereof a movable part, in combination with elements which form with this movable part a magnetic device, the said movable part being actuated as a part of said device by the same lines of magnetic force which pass through the normal circuit through the armature and field of the dynamo or motor, substantially as described.

2. A dynamo or motor with a field magnet so mounted that it can approach and recede from the armature, in combination with elements which form with this pole piece a magnetic device, the pole piece being actuated as a part of said device, by the same lines of magnetic force which pass through the normal circuit through the armature and field of the dynamo or motor, substantially as described.

3. A dynamo or motor in the normal magnetic circuit through the armature and field of which is included as an essential portion thereof a movable part, in combination with a brake for the armature of the dynamo or motor which is operated by said movable part, substantially as described.

4. An electric dynamo or motor having a field magnet so mounted that it can approach and recede from the armature, and a brake for the armature controlled by such movements of the field magnet, substantially as described.

5. A dynamo or motor with a field magnet so mounted on an axis in the base of the machine that it can approach and recede from the armature of the dynamo or motor, in combination with elements which form with this pole piece a magnetic device, the pole piece being actuated as a part of said device by the same lines of magnetic force which pass through the normal circuit through the armature and field of the dynamo or motor, substantially as described.

6. An electric dynamo or motor having a field magnet so mounted on an axis in the base of the machine that it can approach and recede from the armature, and a brake for the armature controlled by such movements of the field magnets, substantially as described.

7. An electric dynamo or motor having a field magnet so mounted that it can approach and recede from the armature, a brake for the armature one end of which is attached to the frame of the machine and the other to the field magnet, which brake normally restrains the armature, but is relieved when the current is turned on and the field magnet is attracted toward the armature, substantially as described.

8. An electric dynamo or motor having a field magnet so mounted on an axis in the base of the machine that it can approach and recede from the armature, a brake for the armature one end of which is attached to the frame of the machine and the other to the field magnet, which brake normally restrains the armature, but is relieved when the current is turned on and the field magnet is attracted toward the armature, substantially as described.

Signed by me, at East Orange, New Jersey, this 26th day of July, 1893.

GANO S. DUNN.

In presence of—
S. S. WHEELER,
D. R. LOVEJOY.